United States Patent
Honda et al.

(10) Patent No.: US 11,277,311 B2
(45) Date of Patent: Mar. 15, 2022

(54) ACCOMMODATION MODE SEARCH APPARATUS, ACCOMMODATION MODE SEARCH METHOD AND PROGRAM

(71) Applicant: Nippon Telegraph and Telephone Corporation, Tokyo (JP)

(72) Inventors: Hirotada Honda, Musashino (JP); Hiroshi Saito, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 16/975,852

(22) PCT Filed: Feb. 22, 2019

(86) PCT No.: PCT/JP2019/006832
§ 371 (c)(1),
(2) Date: Aug. 26, 2020

(87) PCT Pub. No.: WO2019/167838
PCT Pub. Date: Sep. 6, 2019

(65) Prior Publication Data
US 2020/0412617 A1 Dec. 31, 2020

(30) Foreign Application Priority Data
Feb. 27, 2018 (JP) .............................. JP2018-033147

(51) Int. Cl.
*H04L 12/24* (2006.01)
*H04L 41/0893* (2022.01)
(Continued)

(52) U.S. Cl.
CPC ........ *H04L 41/0893* (2013.01); *H04L 41/069* (2013.01); *H04L 41/147* (2013.01); *H04L 43/0811* (2013.01)

(58) Field of Classification Search
CPC . H04L 41/0893; H04L 41/069; H04L 41/147; H04L 43/0811; H04L 41/12; H04L 43/0805; H04L 67/327; H04L 69/40
See application file for complete search history.

(56) References Cited

U.S. PATENT DOCUMENTS

| | | | |
|---|---|---|---|
| 2003/0185153 A1 | 10/2003 | Kohler et al. | |
| 2010/0149988 A1 | 6/2010 | Matsubara et al. | |

(Continued)

FOREIGN PATENT DOCUMENTS

| | | |
|---|---|---|
| JP | 2001-136187 | 5/2001 |
| JP | 2003-527039 | 9/2003 |

(Continued)

OTHER PUBLICATIONS

Saito et al., "Disaster Avoidance Control against Heavy Rainfall," IEEE INFOCOM 2017—IEEE Conference on Computer Communications, 2017, 9 pages.

(Continued)

*Primary Examiner* — Kim T Nguyen
(74) *Attorney, Agent, or Firm* — Fish & Richardson P.C.

(57) ABSTRACT

An accommodation form search apparatus includes a computation unit that computes a failure rate of each of physical links forming a physical network based on information indicating a disaster-affected area; and a search unit that searches for an accommodation form with which a disconnection rate computed based on the failure rate of each physical link is reduced for a path of an accommodated network to be accommodated into a logical network which is configured utilizing the physical network. The search unit searches for the accommodation form treating a plurality of accommodated networks having the same physical path as a (Continued)

single accommodated network, thus improving the efficiency of calculation of the accommodation form for the accommodated networks.

9 Claims, 12 Drawing Sheets

(51) Int. Cl.
*H04L 41/069* (2022.01)
*H04L 41/147* (2022.01)
*H04L 43/0811* (2022.01)

(56) References Cited

U.S. PATENT DOCUMENTS

| | | | |
|---|---|---|---|
| 2012/0176940 A1 | 7/2012 | Matsuura | |
| 2014/0372601 A1* | 12/2014 | Suzuki | H04L 41/5006 709/224 |
| 2015/0195190 A1* | 7/2015 | Shah Heydari | G06F 11/3006 714/47.3 |

FOREIGN PATENT DOCUMENTS

| | | |
|---|---|---|
| JP | 2010-141794 | 6/2010 |
| WO | WO 2011/033650 | 3/2011 |

OTHER PUBLICATIONS

Haider et al., "Recovery Techniques in Next Generation Networks," IEEE Communications Surveys & Tutorials, 2007, 9(3):2-17.

Smith et al., "Contingency/Disaster Recovery Planning for Transmission Systems of the Defense Information System Network," IEEE Journal on Selected Areas in Communications, Jan. 1994, 12(1):13-22.

Tsukuda et al., "SDN Technology for Carrier Network and Its Network Management," Journal of the Institute of Electronics, Information and Communication Engineers, 2013, 96(12):926-930, 11 pages (with English Translation).

* cited by examiner

Fig. 1
(1)
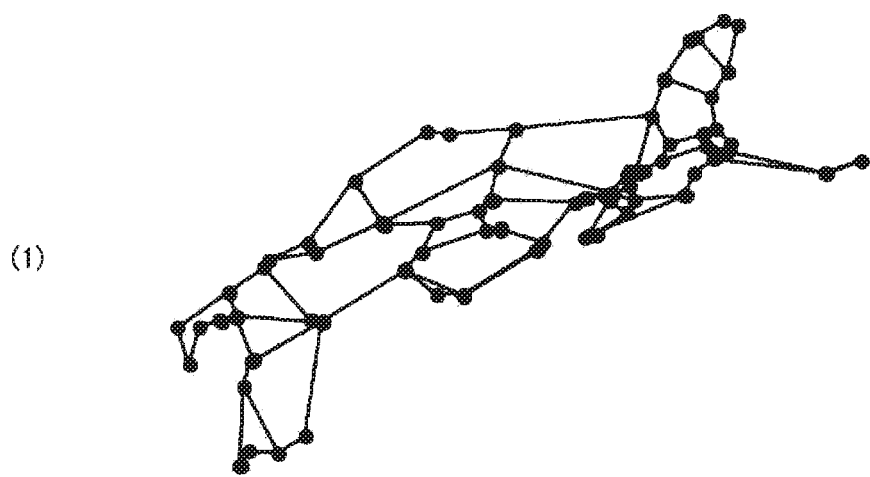
(2)
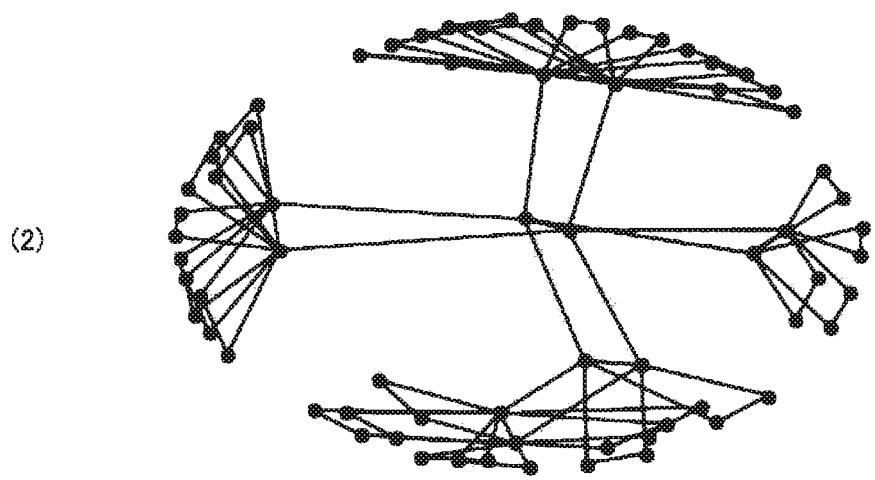

Fig. 10

| NUMBER | 0-1 | 1-2 | 2-3 | 3-4 | 4-0 | CONTINUITY |
|---|---|---|---|---|---|---|
| 1 | ○ | ○ | ○ | ○ | ○ | ○ |
| 2 | ○ | ○ | ○ | ○ | × | ○ |
| 3 | ○ | ○ | ○ | × | ○ | ○ |
| 4 | ○ | ○ | ○ | × | × | × |
| 5 | ○ | ○ | × | ○ | ○ | ○ |
| 6 | ○ | ○ | × | ○ | × | × |
| 7 | ○ | ○ | × | × | ○ | × |
| 8 | ○ | × | × | × | × | × |
| 9 | ○ | × | ○ | ○ | ○ | ○ |
| 10 | ○ | × | ○ | ○ | × | × |
| 11 | ○ | × | ○ | × | ○ | ○ |
| 12 | ○ | × | × | ○ | × | × |
| 13 | ○ | × | × | ○ | ○ | ○ |
| 14 | ○ | × | × | × | × | × |
| 15 | ○ | × | × | × | ○ | ○ |
| 16 | ○ | × | × | × | × | × |

| NUMBER | 0-1 | 1-2 | 2-3 | 3-4 | 4-0 | CONTINUITY |
|---|---|---|---|---|---|---|
| 17 | × | ○ | ○ | ○ | ○ | ○ |
| 18 | × | ○ | ○ | ○ | × | × |
| 19 | × | ○ | ○ | × | ○ | ○ |
| 20 | × | ○ | ○ | × | × | × |
| 21 | × | ○ | × | ○ | ○ | ○ |
| 22 | × | ○ | × | ○ | × | × |
| 23 | × | ○ | × | × | ○ | ○ |
| 24 | × | × | × | × | × | × |
| 25 | × | × | ○ | ○ | ○ | ○ |
| 26 | × | × | ○ | ○ | × | × |
| 27 | × | × | ○ | × | ○ | ○ |
| 28 | × | × | × | × | × | × |
| 29 | × | × | × | ○ | ○ | ○ |
| 30 | × | × | × | ○ | × | × |
| 31 | × | × | × | × | ○ | ○ |
| 32 | × | × | × | × | × | × |

ACCOMMODATION MODE SEARCH APPARATUS, ACCOMMODATION MODE SEARCH METHOD AND PROGRAM

CROSS-REFERENCE TO RELATED APPLICATIONS

This application is a National Stage application under 35 U.S.C. § 371 of International Application No. PCT/JP2019/006832, having an International Filing Date of Feb. 22, 2019, which claims priority to Japanese Application Serial No. 2018-033147, filed on Feb. 27, 2018. The disclosure of the prior application is considered part of the disclosure of this application, and is incorporated in its entirety into this application

TECHNICAL FIELD

The present invention relates to an accommodation form search apparatus, an accommodation form searching method, and a program.

BACKGROUND ART

In network-based services, two approaches are used for natural disasters: a proactive measure and a reactive measure. A proactive measure is an approach relying on facility design, designing and deploying facilities in expectation of failures at the time of a disaster such that devices will function as a network if one of them is functional should the other device is affected by a disaster and becomes non-functional. A reactive measure is an approach relying on avoidance control, attempting to continue network services by routing part of traffic to other paths as well by switching to a backup device or changing the arrangement of server functions or paths.

These techniques merely apply approaches for addressing unpredictable events such as failures also to disasters, and are not intended specifically for use at the time of a disaster (Non-Patent Literatures 1 and 2, for instance).

CITATION LIST

Non-Patent Literature

Non-Patent Literature 1: Aun Haider and Richard Harris, Recovery Techniques in Next Generation Networks, IEEE Communications Surveys, 9, 3, 2007.
Non-Patent Literature 2: David R. Smith, Walter J. Cybrowski, Frank Zawislan, Donald Arnstein, Allen D. Dayton, and Theodore D. Studwell, Contingency/Disaster Recovery Planning for Transmission Systems of the Defense Information System Network, IEEE Journal on Selected Areas in Communications, 12, 1, 1994.
Non-Patent Literature 3: Tsukuda Masanobu and Sato Yoichi, SDN application and operation management technique in carrier network, the Journal of Institute of Electronics Information and Communication Engineers, 96, 12, 2013.

SUMMARY OF THE INVENTION

Technical Problem

With the advancement in meteorology and the like, prediction of disasters such as typhoons and tsunamis has become possible. Municipalities prepare hazard maps and the like for disasters and provide information on expected damage at a possible disaster. However, these efforts have hardly been utilized for improving the disaster resistance of networks. Further, while the degree of freedom in network control has been increasing with the advancement of network virtualization techniques (e.g., Non-Patent Literature 3), the disaster resistance of virtualized networks (virtual networks) accommodated in physical and logical networks and that of control systems (e.g., control devices) of virtual networks pose a challenge.

While optimum calculation is required for rearrangement of accommodated networks, it is known that the computational complexity of such calculation typically exponentially increases depending on the number of accommodated networks and network scale. Particularly in calculating a rearrangement of a large number of accommodated networks on a wide area network, there is an issue that only a limited quantity of accommodated networks are likely to be moved due to limitation in computational resources.

The present invention has been made in view of the foregoing and has an object of improving the efficiency of calculation of an accommodation form for accommodated networks.

Means for Solving the Problem

To that end, an accommodation form search apparatus includes a computation unit that computes a failure rate of each of physical links forming a physical network based on information indicating a disaster-affected area; and a search unit that searches for an accommodation form with which a disconnection rate computed based on the failure rate of each physical link is reduced for a path of an accommodated network to be accommodated into a logical network which is configured utilizing the physical network. The search unit searches for the accommodation form treating a plurality of accommodated networks having the same physical path as a single accommodated network.

Effects of the Invention

The efficiency of calculation of an accommodation form for accommodated networks can be improved.

BRIEF DESCRIPTION OF DRAWINGS

FIG. 1 shows an example of a physical network and a logical network.

FIG. 10 shows an exemplary enumeration of failure occurrence patterns of physical links on a physical network.

DESCRIPTION OF EMBODIMENTS

Figure 2:
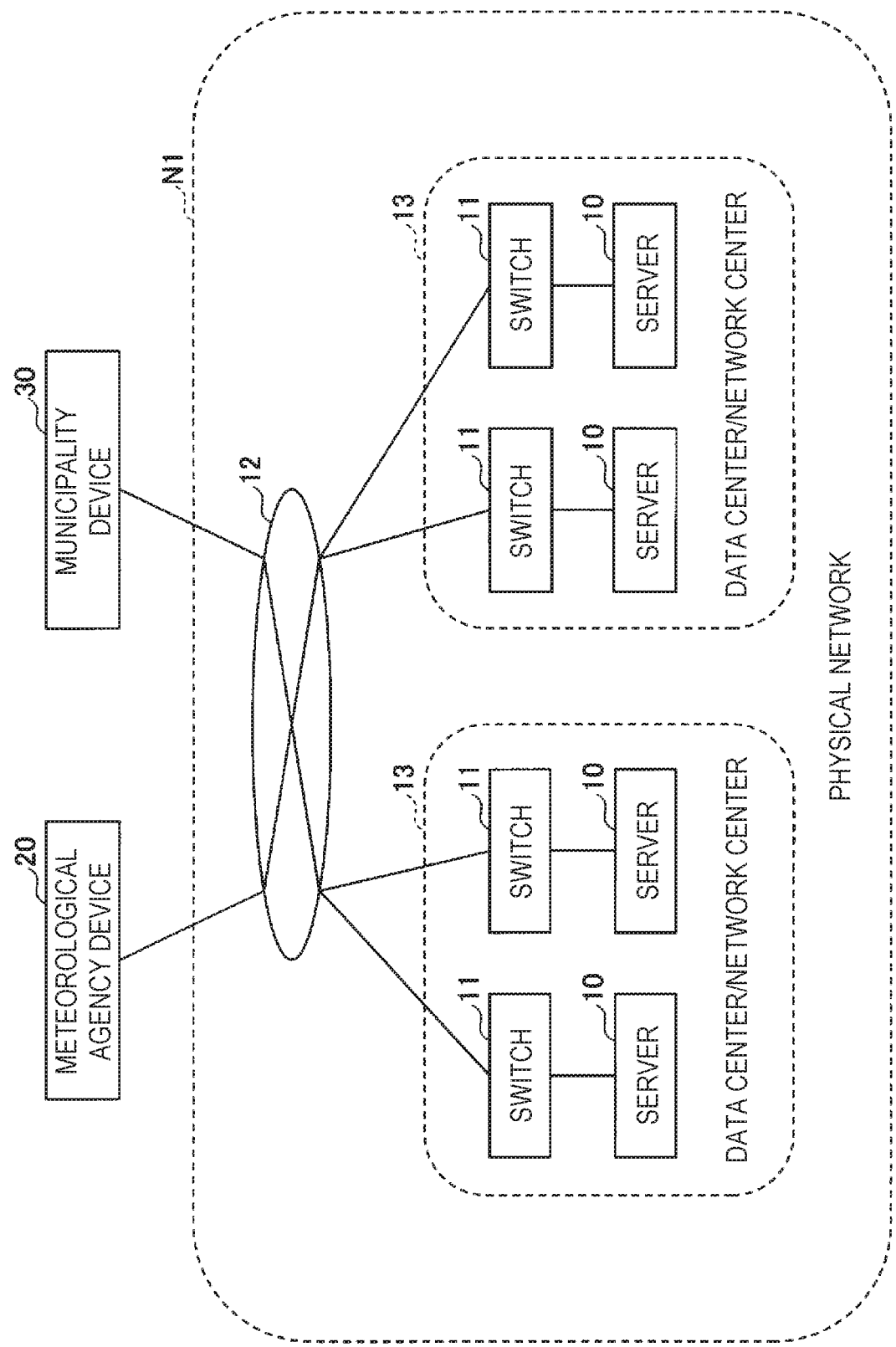
FIG. 2 shows an exemplary system configuration in a first embodiment.

Embodiments of the present invention are now described with reference to the drawings. In the embodiments of the present invention, a physical network indicates a physically implemented network formed of conduits, optical fiber cables and the like, while a logical network indicates a logically implemented network that is logically constructed or connected by means of devices or facilities on a physical network. In both of the physical network and the logical network, nodes forming the network are generally classified into relay nodes which are only responsible for data transfer and server nodes as computer resources equipped with servers or virtual machines.

FIG. 1 shows an example of a physical network and a logical network. In FIG. 1, (1) shows a physical network with relay nodes and server nodes deployed on a conduit network, and (2) shows a logical network formed utilizing the physical network of (1). The logical network has the same node correspondence as the physical network of (1). However, each link in the logical network is configured based on having connectivity on the physical network and on logical constraints. For example, if there is continuity relationship between two certain nodes in the physical network, those nodes are connected by a link in the logical network assuming that there is a logical link between them.

In the embodiments of the present invention, a virtual network means a network that is virtually implemented on a logical network in response to a user's request, with some service provided in a closed manner within the network. For example, a required band, server functions and the like are designated for a request from a user. A path capable of meeting the requirements on the logical network is assigned onto the logical network as a virtual network. Accordingly, a virtual network is formed of server functions arranged at server nodes on the logical network, relay nodes, and paths accommodated on links of the logical network between the server nodes and the relay nodes. An example of a virtual network is a VPN (Virtual Private Network).

Networks that can be accommodated on a logical network in the embodiments of the present invention include virtual networks, control-related virtual networks, and control-related logical networks. A control-related virtual network refers to a virtual network for controlling a virtual network. That is, a virtual network is a virtually implemented network that is accommodated into a logical network in response to a user's request, whereas a control-related virtual network is a virtually implemented network that a network operator assigns to a logical network in order to control a virtual network, for example. An example of a control-related logical network can be a logical network that serves as an OpenFlow controller or an orchestrator for controlling and managing the assignment of physical network resources. When a control-related virtual network and a control-related logical network are not distinguished, they will be referred to as "control network" hereinafter. When a virtual network and a control network are not distinguished, they will be referred to as "accommodated network". That is, the accommodated network is a collective term representing networks that can be accommodated into a logical network.

Note that while the examples described below are for achieving improvement in the disaster tolerance of accommodated networks, the embodiments of the present invention may be applied to control-related physical networks.

FIG. 2 shows an exemplary system configuration in a first embodiment. The system shown in FIG. 2 includes a Meteorological Agency device 20, a municipality device 30, and a physical network N1.

The physical network N1 includes a conduit network 12 and multiple data centers (or network centers) 13 connected by the conduit network 12. Each data center (or network center) 13 includes multiple switches 11 and servers 10. The switch 11 functions as a relay node. The server 10 functions as a server node.

Figure 3:
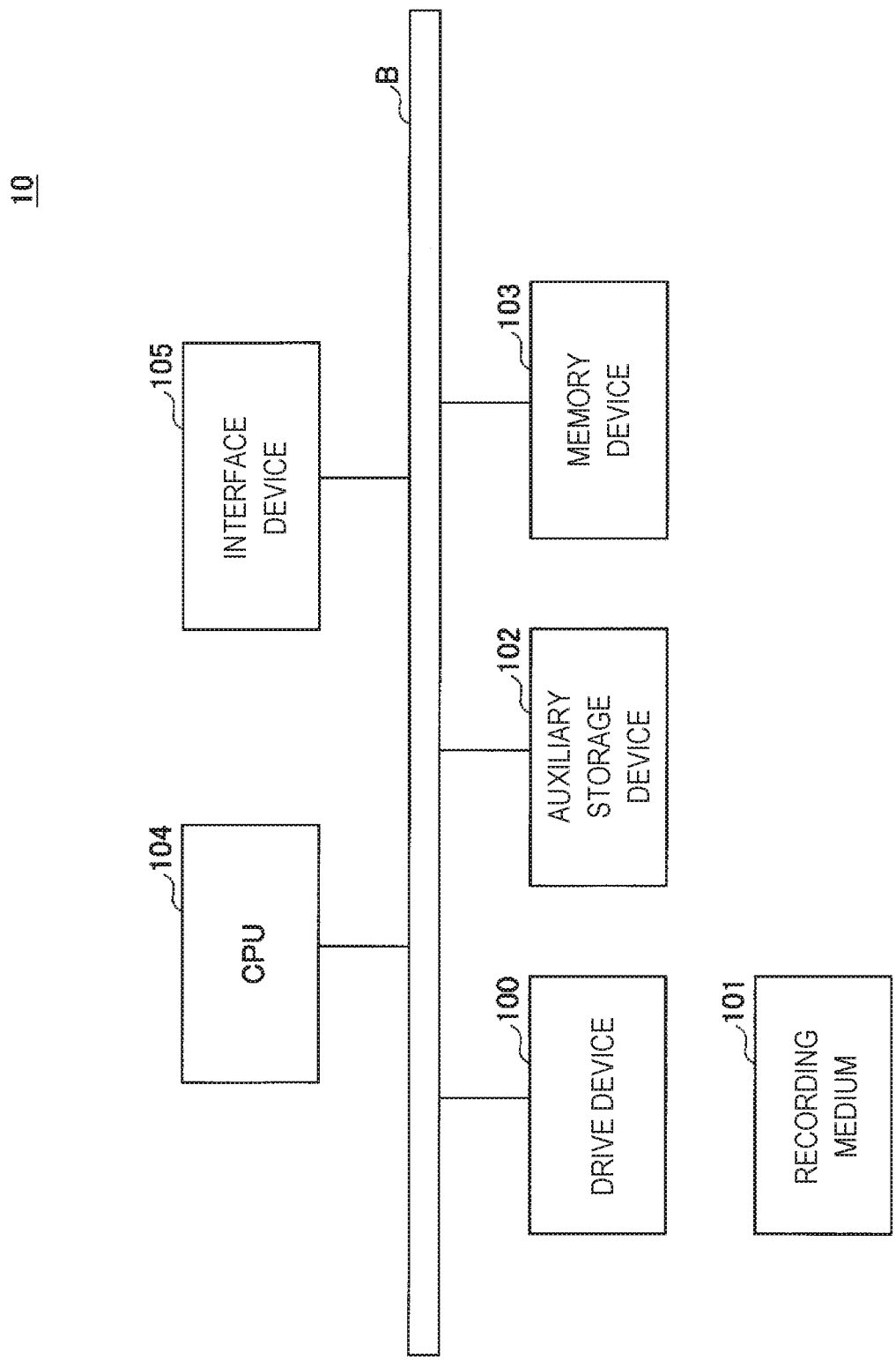
FIG. 3 shows an exemplary hardware configuration of a server 10 in the first embodiment.

FIG. 3 shows an exemplary hardware configuration of each server 10 in the first embodiment. The server 10 of FIG. 3 has a drive device 100, an auxiliary storage device 102, a memory device 103, a CPU 104, and an interface device 105, which are interconnected by a bus B.

A program that implements processing at the server 10 is provided through a recording medium 101 such as a CD-ROM. When the recording medium 101 storing the program therein is set into the drive device 100, the program is installed from the recording medium 101 into the auxiliary storage device 102 via the drive device 100. The installation of the program however does not have to be done from the recording medium 101; it may be downloaded from another computer over a network. The auxiliary storage device 102 stores the installed program and necessary files and data as well.

The memory device 103 reads the program from the auxiliary storage device 102 and stores it when an instruction to activate the program is given. The CPU 104 executes functions associated with the server 10 in accordance with the program stored in the memory device 103. The interface device 105 is used as an interface for connecting to a network.

In this embodiment, an operation center 110 is configured with one or more servers 10 having such a hardware configuration as shown in FIG. 3.

Figure 4:
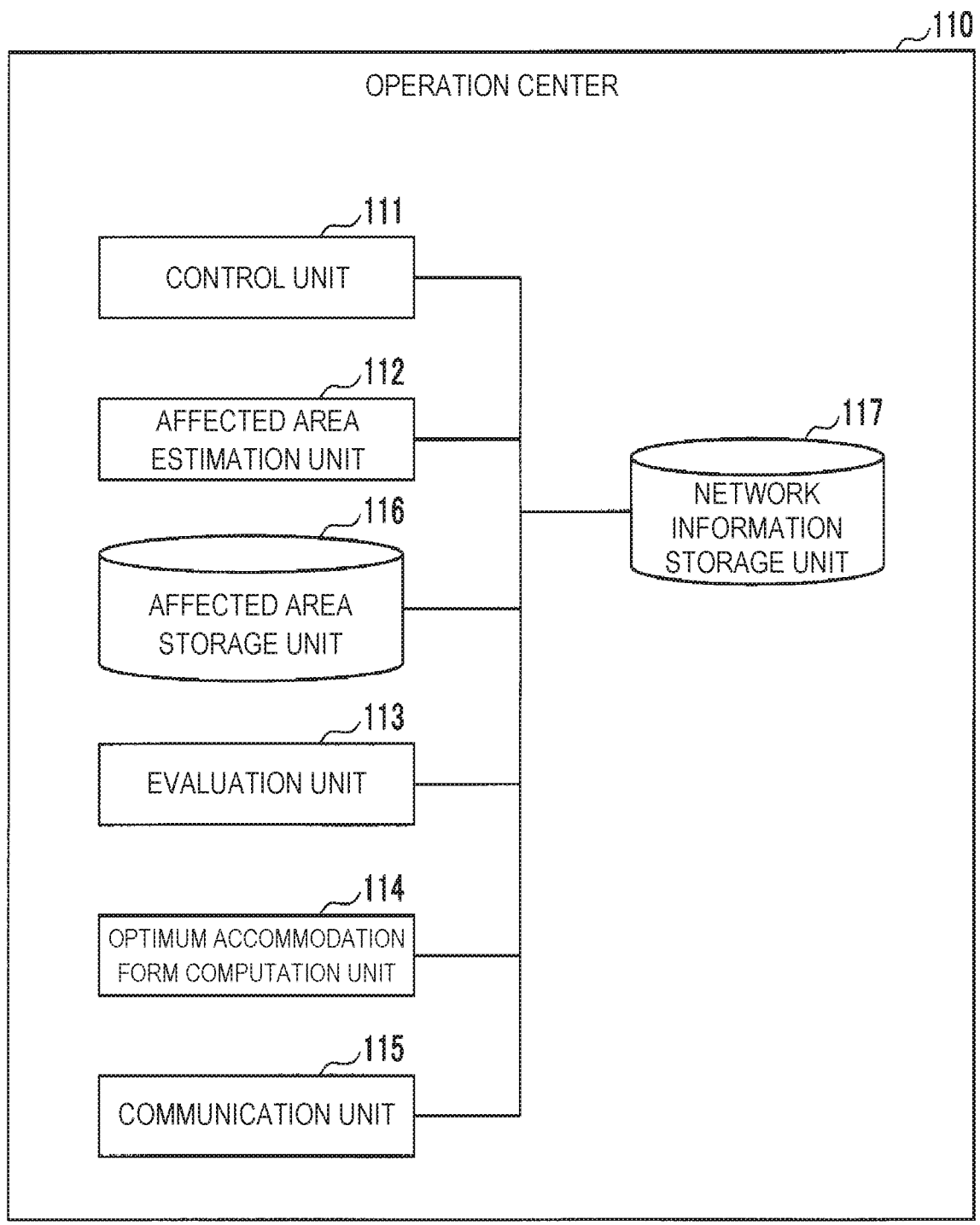
FIG. 4 shows an exemplary functional configuration of an operation center 110 in the first embodiment.

FIG. 4 shows an exemplary functional configuration of the operation center 110 in the first embodiment. In FIG. 4, the operation center 110 includes a control unit 111, an affected area estimation unit 112, an evaluation unit 113, an optimum accommodation form computation unit 114, and a communication unit 115. These components are embodied by processing that one or more programs installed in any of the one or more servers 10 causes the CPU 104 of the server 10 to execute. The operation center 110 also includes an affected area storage unit 116 and a network information storage unit 117. These storage units can be implemented using the auxiliary storage device 102 of any of the one or more servers 10, for example.

The network information storage unit 117 stores a topology of a physical network, bands of physical links forming the physical network, a topology of a logical network, available bands and delays of links in the logical network, and accommodation forms (topologies) of accommodated networks accommodated on the logical network and required bands for the accommodated networks, etc.

The control unit 111 functions as an accommodated network control device for controlling the arrangement (accommodation) of an accommodated network into a logical network. Although this embodiment shows an example where the accommodated network control device is split into two parts: an active system and a backup system, the accommodated network control device is not limited to this configuration. The accommodated network control device is connected by a control network with a virtual network to be controlled. The accommodated network control device as the active system (the active accommodated network control device) is connected with accommodated networks (control networks and virtual networks) as the active systems. The accommodated network control device as the backup system (the backup accommodated network control device) is connected with accommodated networks (control networks and virtual networks) as the backup systems. The accommodated network control device itself is also a component of the control network. In other words, the accommodated network control device is configured being accommodated in the control network.

Other functions of the control unit 111 and the functions of the other components will be presented in the description of a processing procedure.

Figure 5:
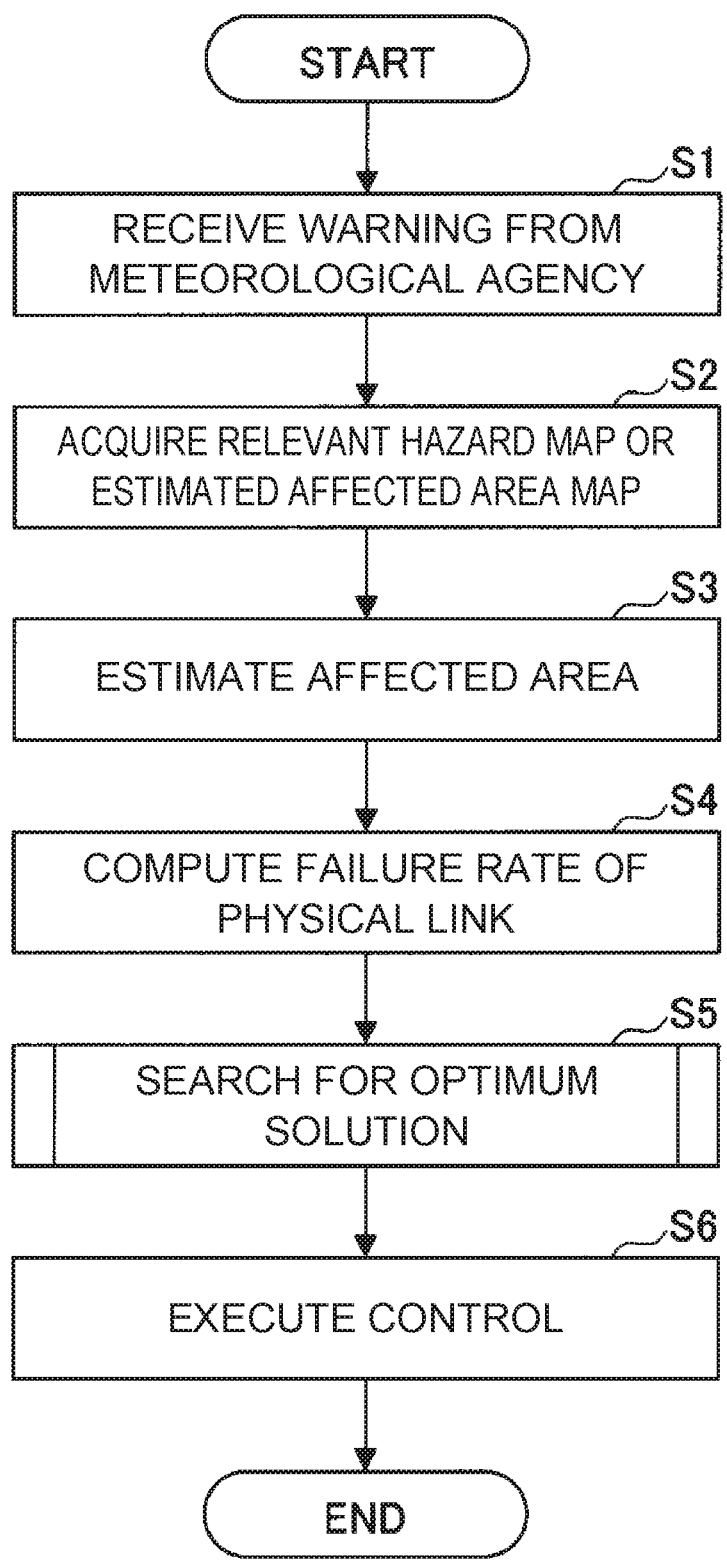
FIG. 5 is a flowchart for describing an example of a processing procedure executed at the operation center 110 in the first embodiment.

A processing procedure which is executed at the operation center 110 is now described. FIG. 5 is a flowchart for describing an example of the processing procedure executed at the operation center 110 in the first embodiment.

At step S1, the communication unit 115 receives a warning such as a weather warning transmitted from the Meteorological Agency device 20. The Meteorological Agency device 20 transmits a warning when the occurrence of a disaster is anticipated, for example.

Although this embodiment illustrates a case where a warning from the Meteorological Agency is issued as an example, this is not limitative and distributed disaster prediction information or a weather forecast may be used.

Then, the control unit 111 ascertains a warning category, a warning level, and a warning target region for the received warning, based on which it accesses the municipality device 30 of each municipality relevant to the warning via the communication unit 115 to acquire the latest relevant hazard map or an estimated affected area map for the target region (S2). A municipality device 30 relevant to a warning refers to the municipality device 30 in a region covered by the warning. The control unit 111 may instead access the municipality device 30 via the communication unit 115 beforehand to acquire a hazard map or an estimated affected area map for each region and store the hazard maps or estimated affected area maps in the affected area storage unit 116. In that case, at step S2, the relevant hazard map or estimated affected area map for the region covered by the warning may be retrieved from the affected area storage unit 116.

Then, the affected area estimation unit 112 estimates an affected area (disaster area) based on the relevant hazard map or the estimated affected area map (S3). Information indicative of the estimated affected area (the estimated affected area) is stored in the affected area storage unit 116. When only the relevant hazard map has been acquired, the affected area estimation unit 112 estimates the affected area in the target region based on the relevant hazard map. While a method of estimating an affected area is not limited to a particular one, affected areas included in the relevant hazard map may be directly used as estimated affected areas, for example. Alternatively, per-level affected areas present in the relevant hazard map may be chosen as estimated affected areas according to a predetermined probability.

The evaluation unit 113 then evaluates (computes) a failure rate 1510 of each of the physical links forming the physical network N1 based on information stored in the network information storage unit 117 and the estimated affected area stored in the affected area storage unit 116 (S4). The failure rate of a physical link refers to the probability of communication using the physical link becoming unavailable due to a failure of the physical link. For a method of computing such a value, reference may be made to H. Saito, "Spatial Design of Physical Network Robust against Earthquakes", Journal of Lightwave Technology 33 (2015), 443-458., and Y. Ikeda, R. Kawahara and H. Saito, "Generating a network reliability formula by using binary decision diagram", IEICE Communications Express 4 (2015), 299-303, for example.

Then, based on the failure rate 1510 of each physical link and the like, the optimum accommodation form computation unit 114 searches for (computes) an accommodation form (path) that minimizes the influence of the disaster to which the warning pertains for each of the accommodated networks (S5). The result of search is called "optimum accommodation form 1540" hereinafter.

Then, the control unit 111 executes control for rearrangement on each of accommodated networks that are to be rearranged in the optimum accommodation form 1540 computed by the optimum accommodation form computation unit 114 (S6). In this embodiment, rearrangement of an accommodated network means changing the arrangement of the server functions (server nodes), relay nodes, paths and the like contained in the accommodated network. In doing so, switching from the active system to the backup system may be done for the accommodated network control device. In this case, data or the like in the active accommodated network control device will be moved to the backup accommodated network control device. A method for such data movement may follow known techniques. For example, it can be easily carried out by means of techniques like SDN controller and OpenStack or a combination thereof.

Next, the processing executed at step S5 by the optimum accommodation form computation unit 114 is described in greater detail. First, a functional configuration of the optimum accommodation form computation unit 114 is described.

Figure 6:
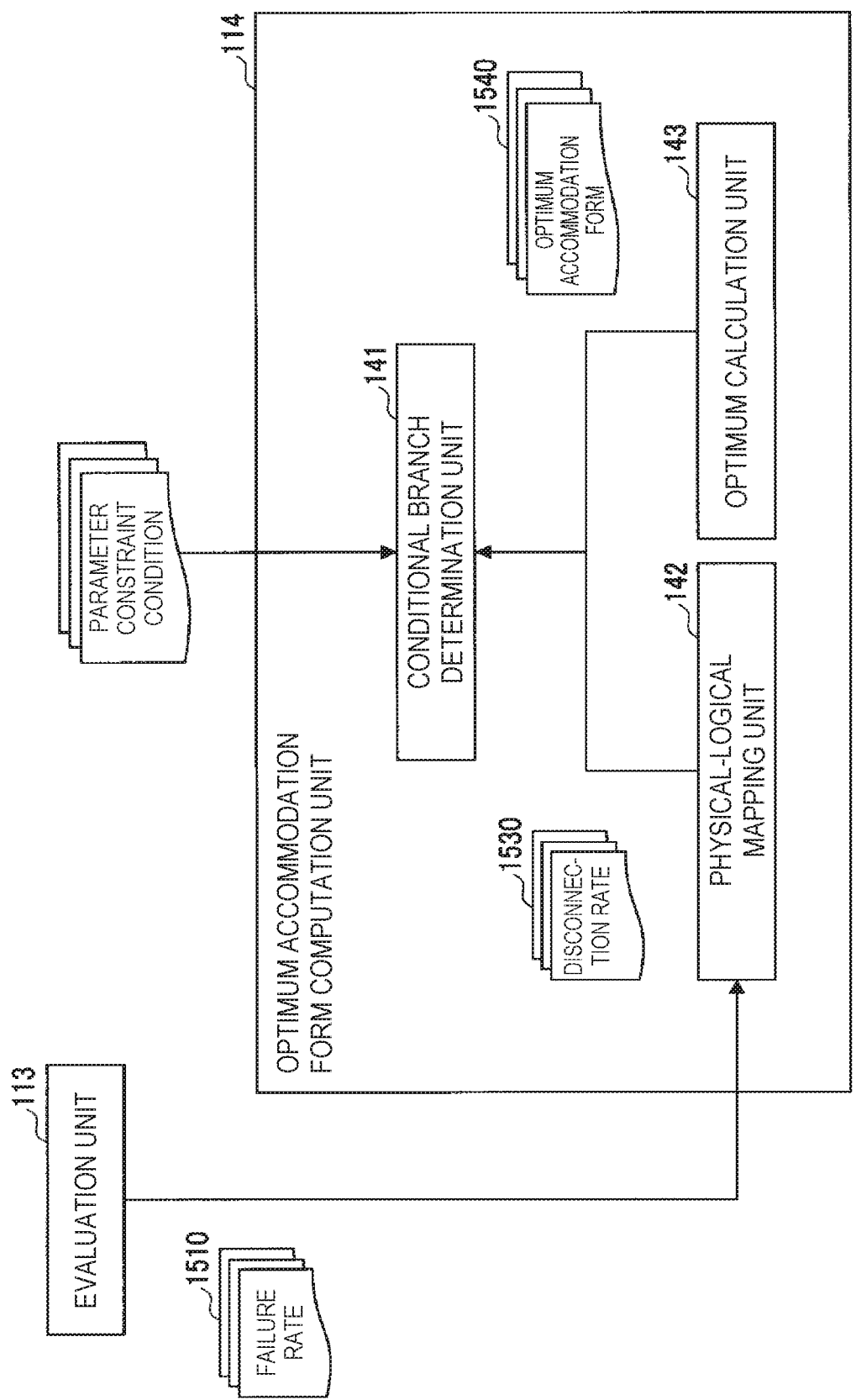
FIG. 6 shows an exemplary functional configuration of an optimum accommodation form computation unit 114 in the first embodiment.

FIG. 6 shows an exemplary functional configuration of the optimum accommodation form computation unit 114 in the first embodiment. In FIG. 6, the optimum accommodation form computation unit 114 includes a conditional branch determination unit 141, a physical-logical mapping unit 142, and an optimum calculation unit 143.

The conditional branch determination unit 141 determines whether rearrangement is necessary or not for a set of accommodated networks accommodated (arranged) on a logical network. If it determines rearrangement is necessary, the conditional branch determination unit 141 has the optimum calculation unit 143 compute the optimum accommodation form 1540.

The physical-logical mapping unit 142 computes a disconnection rate 1530 of each of the accommodated networks on the logical network based on the failure rate 1510 output from the evaluation unit 113. The disconnection rate of an accommodated network refers to the probability of a connection path between any two nodes of the accommodated network being lost due to occurrence of a failure on a certain physical link (including the case of multiple physical links) of the physical network.

The optimum calculation unit 143 solves a 0-1 integer programming, a mixed-integer programming problem or the like and calculates the optimum accommodation form 1540 for the accommodated network based on the resulting solution.

Inputs to the optimum accommodation form computation unit 114 are: the failure rate 1510 of each physical link output by the evaluation unit 113; information obtained from the network information storage unit 117 (the topologies of the physical network and the logical network in question, the available band and delay of each link in the physical network, and the topology (accommodation form) of each accommodated network); a constraint condition entered by an operator 170 discussed later; and the following parameters:

$\theta_1$: a threshold utilized in determining the necessity of rearrangement and determining an accommodated network set for rearrangement in suboptimization $\varepsilon_2$: a threshold utilized in comparison between an optimum solution candidate and the current accommodation form $k_i$ (i=1, 2): a positive constant utilized for weighting of an objective function Output from the optimum accommodation form computation unit 114 is necessity or non-necessity of executing the rearrangement of the accommodated networks. When rearrangement is necessary, the accommodation form after rearrangement (the optimum accommodation form 1540) is also output.

In this embodiment, for the backup accommodated network control device, it is allowed to have some constraint regarding the delay of a physical network to be accommodated. In the following, this will be called constraint condition (i).

Figure 7:
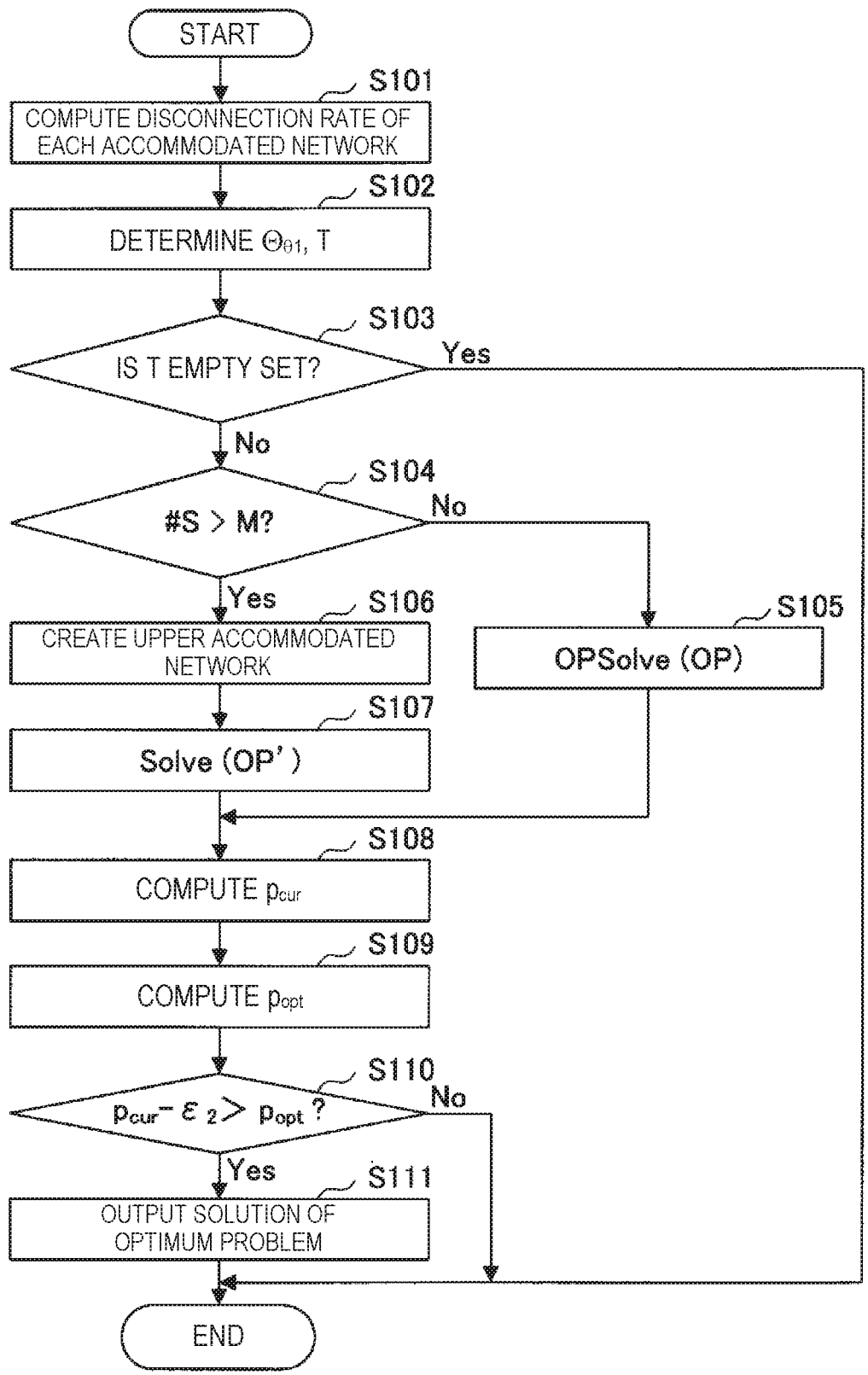
FIG. 7 is a flowchart for describing an example of the processing procedure executed by the optimum accommodation form computation unit 114 in the first embodiment.

FIG. 7 is a flowchart for describing an example of the processing procedure executed by the optimum accommodation form computation unit 114 in the first embodiment.

At step S101, the physical-logical mapping unit 142 computes the disconnection rate of each accommodated network based on the failure rate 1510 of each physical link.

Then, at step S102, based on the disconnection rate of the accommodated networks to which the active or backup accommodated network control device connects, the conditional branch determination unit 141 computes the following measures (candidate node set $\Theta_{\theta_1}$ and rearrangement target accommodated network set T) for each server 10 at which any of the accommodated networks terminates.

$$\Theta_{\theta_1} \equiv \left\{ v \in V_{(d)} \,\middle|\, J(s) \equiv \right.$$ [Formula 1]

$$\left. k_1 \max_{s|\mathcal{T}_1[s]=v} q[s] + k_2 \sum_{s|\mathcal{T}_1[s]=v} q[s] / \#\{s \mid \mathcal{T}_1[s] = v\} > \theta_1 \right\},$$

$$\mathcal{T} \equiv \left\{ s \in \mathcal{S} \equiv \bigcup_{v \in V_{(a)}} \mathcal{S}_v \,\middle|\, \mathcal{T}_1[s] \in \Theta_{\theta_1} \right\}$$

The following is description of the symbols in the formula:
V(d): a set of server nodes.

τ1[s]: a server node as an end point of an accommodated network s.
v: a server node.
s: an accommodated network.
q[s]: the disconnection rate of the accommodated network.
$S_v$: a set of accommodated networks that end at server node v.

The candidate node set $\Theta_{\theta_1}$ refers to a set of server nodes for which measure J(s) representing the possibility of leading to disconnection of an accommodated network terminating at that node exceeds a predetermined threshold. Although the formula above shows a weighted sum of the maximum and the average of the disconnection rate of each accommodated network with $k_1$ and $k_2$ as an example of J(s), J(s) may be the maximum or the average (average disconnection rate) itself, for example.

The rearrangement target accommodated network set T is a set of accommodated networks for which the server node that terminates the accommodated network belongs to the candidate node set $\Theta_{\theta_1}$.

Here, $k_1$ and $k_2$ are given positive real constants, and $\theta_1$ is a threshold that has values on (0, 1).

Then, the conditional branch determination unit 141 determines whether the rearrangement target accommodated network set T is an empty set or not (S103). If the rearrangement target accommodated network set T is an empty set (Yes at S103), it indicates that there is no accommodated network for rearrangement and the processing ends.

If the rearrangement target accommodated network set T is not an empty set (No at S103), the conditional branch determination unit 141 determines whether a total number of accommodated networks #S exceeds a predetermined threshold M or not (S104). If the total number of accommodated networks #S does not exceed the threshold M (No at S104), the optimum calculation unit 143 solves an optimization problem (OP) for considering an optimal (or sub-optimal) rearrangement form for each accommodated network as discussed later (S105).

When the total number of accommodated networks #S exceeds the predetermined threshold M (Yes at S104), the physical-logical mapping unit 142 bundles multiple accommodated network having a certain relationship to create an upper accommodated network (S106).

Figure 8:
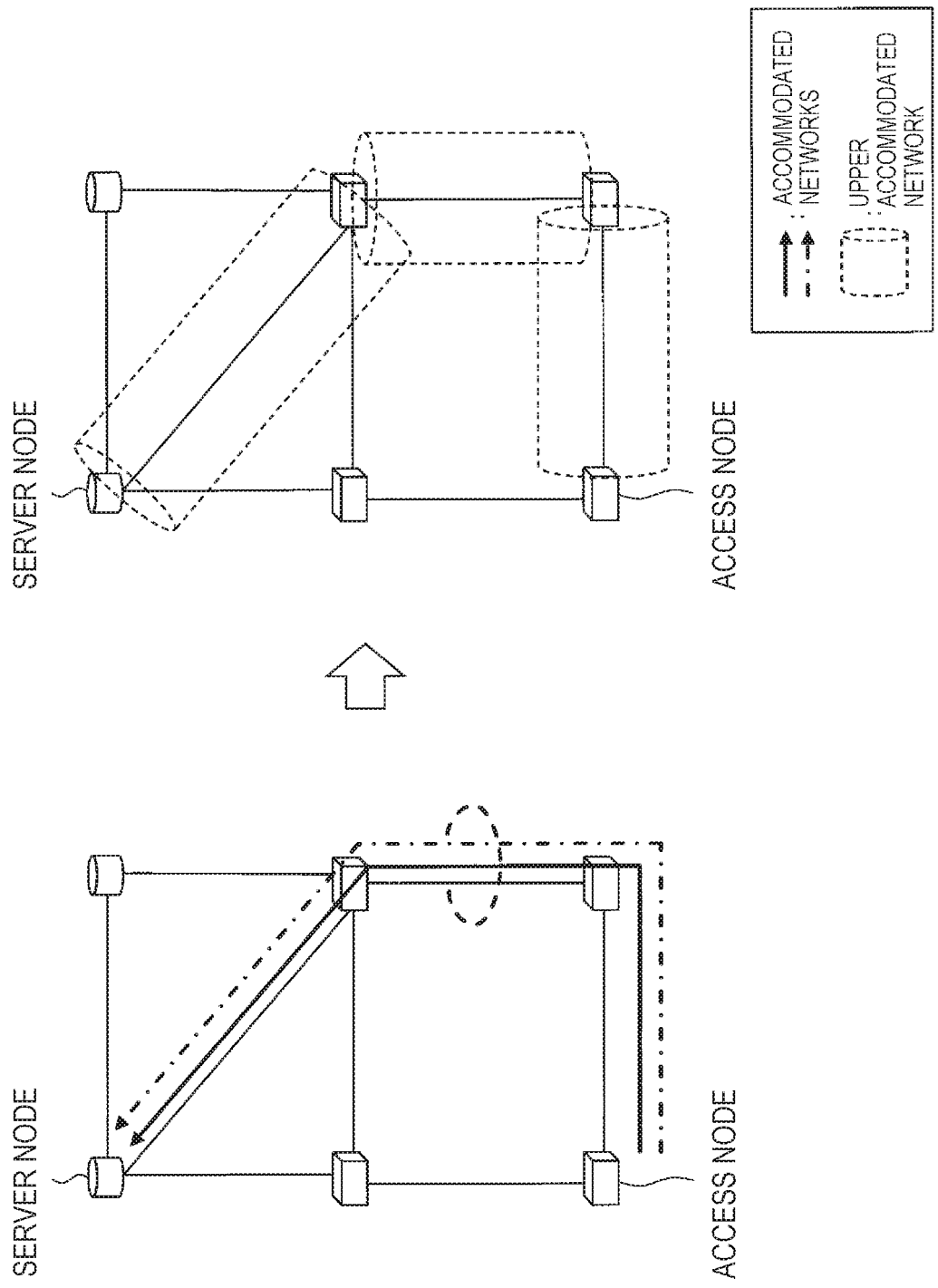
FIG. 8 is a diagram for describing an upper accommodated network.

FIG. 8 is a diagram for describing upper accommodated networks. As shown in FIG. 8, an upper accommodated network is formed by treating multiple accommodated networks that have the same starting point, end point, and path (i.e., have the same physical path) as each other on the physical network as a single accommodated network (integrating them into a single accommodated network). Accommodated networks that are integrated into an upper accommodated network will subsequently be subjected to processing (such as search for an accommodation form) as one accommodated network.

Then, the optimum calculation unit 143 solves an optimization problem (OP') for considering an optimum (or sub-optimum) rearrangement form for each accommodated network as discussed later (S107).

Following step S105 or S107, the conditional branch determination unit 141 computes an average $p_{cur}$ of the disconnection rates of all the accommodated networks to which the active accommodated network control device is connected at present (S108). "At present" means a state prior to optimization.

Then, the conditional branch determination unit 141 computes an average $p_{opt}$ of the disconnection rates of the upper accommodated networks that connects to the active accommodated network control device or the backup accommodated network control device which is achieved with the optimum solution output by the optimum calculation unit 143 (S109).

If $p_{cur}-\varepsilon_2 > p_{opt}$ holds (Yes at S110), the conditional branch determination unit 141 determines to adopt the optimum solution as the optimum accommodation form 1540 to rearrange a controlled network, and outputs the optimum solution to the control unit 111 (S111). Accordingly, in this case a shift to the optimum solution is carried out by the control unit 111. Here, switching of the accommodated network control device from the active system to the backup system may be determined.

When $p_{cur}-\varepsilon_2 > p_{opt}$ does not hold (No at S110), it is determined that no further effect is expected even if control is carried out on the entire accommodated network (i.e., rearrangement is unnecessary) and then the processing ends.

Next, step S101 is described in detail.

In computation of the disconnection rate of each accommodated network, the physical-logical mapping unit 142 first enumerates all combinations of connected state or disconnected state of physical links (whether there is a failure or not) (failure occurrence patterns). The physical-logical mapping unit 142 then extracts failure occurrence patterns in which the accommodated network of interest is in disconnected state from the enumerated failure occurrence patterns. Since failures of physical links are considered to occur independently, these failure occurrence patterns can be considered as events that occur independently from each other. Thus, by determining the total sum of the probabilities that the respective extracted failure occurrence patterns occur, the disconnection rate of the accommodated network in question can be obtained.

Figure 9:
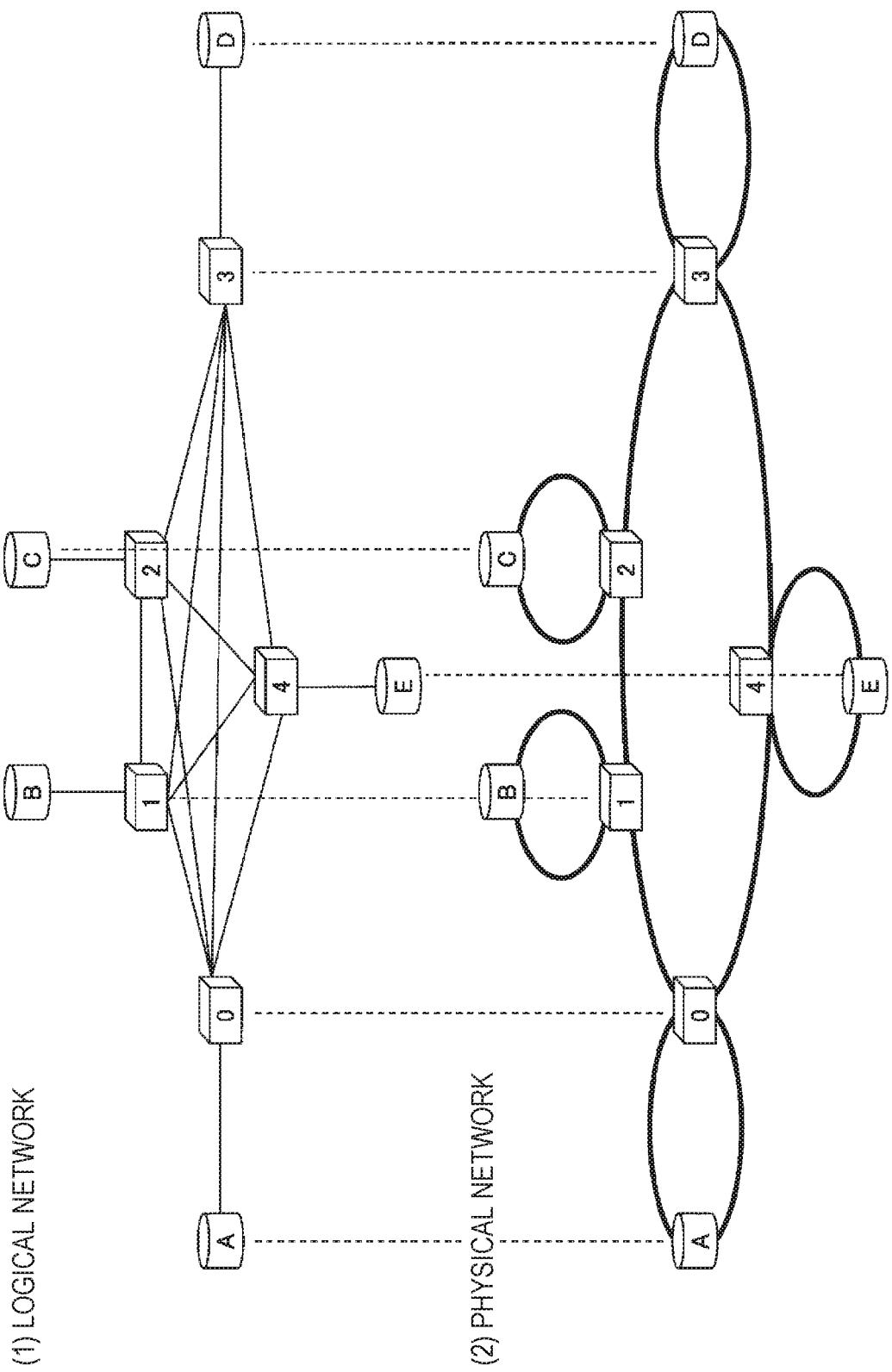
FIG. 9 shows an example of a physical network and a logical network that are assumed for description of how to compute the disconnection rate of an accommodated network.

By way of example, imagine the physical network shown in FIG. 9 (2) and the logical network shown in (1) for the sake of simplicity. Consider the disconnection rate of accommodated network "0-4-E" on the logical network here.

FIG. 10 shows an exemplary enumeration of the failure occurrence patterns of the physical links on the physical network. In FIG. 10, each row corresponds to a failure occurrence pattern of the physical links. The rightmost column of the table indicates whether the accommodated network "0-4-E" is in continuity or becomes disconnected with the failure occurrence pattern of each row (○ indicates being in continuity and x indicates being disconnected). Accordingly, a set of the numbers of failure occurrence patterns for which the accommodated network in question is in disconnected state is:

$Y=\{4, 6, 7, 8, 10, 12, 14, 16, 18, 20, 22, 24, 26, 28, 30, 32\}$, or 16 patterns.

Here, letting $p_{xy}$ representing the failure rate of the physical link between nodes x and y, the probability of occurrence $P_4$ of number 4, for example, is represented as $P_4=(1-p_{01})(1-p_{12})(1-p_{23})p_{34}p_{40}$. In a similar manner, the physical-logical mapping unit 142 also computes the occurrence probabilities of the other failure occurrence patterns in Y. Meanwhile, as nodes 4 and E form a sub-ring therebetween, the two nodes lose continuity only if both the clockwise and counterclockwise physical links are disconnected. Letting $q_{4E}$ represent the probability of both the clockwise and counterclockwise physical links being disconnected, probability q is computed as follows.

$$q = \sum_{x \in Y} P_x + q_{4E} \sum_{x \in Y}(1 - P_x) \quad \text{[Formula 2]}$$

where the value of q is the disconnection rate of the accommodated network in question, being the output from the physical-logical mapping unit 142.

Calculation of the solution by the optimum calculation unit 143 at step S105 or S107 is now described.

The optimum calculation unit 143 performs optimum calculation using as input the rearrangement target accommodated network set T selected by the conditional branch determination unit 141, the disconnection rate 1530 of the accommodated networks as output from the physical-logical mapping unit 142, and parameters and the constraint condition (i) contained in an input from the operator 170.

First, for each of the accommodated networks or upper accommodated networks belonging to the rearrangement target accommodated network set T, the optimum calculation unit 143 enumerates all of the paths on the logical network corresponding to the accommodated network in question. At step S105, the optimum calculation unit 143 solves the following 0-1 linear programming with them. (OP)

$$\text{Minimize } J(s;T)=k1 \max_{a \in T} q[s]+k2 \Sigma_{a \in T} q[s]/\#T; \quad \text{[Formula 3]}$$

s.t. $z \geq q[r]y_r$ $r \in U_{a \in S} R^{(a)}$;
$z \geq \max_{s \in T^C} q[s]$;
$x_r^{(a)} \leq y_r$ $(s,r) \in \Omega = U_{s \in T^C}\{s\} \times R^{(s)}$;
$\Sigma_{r \in R(s)} x_r^{(s)}=1$ $s \in T$;
$z \in R_+$, $x_r^{(s)}$, $y_r \in \{0, 1\}$ $(s,r) \in \Omega$;
$\Sigma_{(s,r) \in \Omega}(b_s^{(0)} u_{r,e}^{(s)}+\tilde{b}_s^{(0)} \tilde{u}_{r,e}^{(s)}) x_r^{(s)} \leq \bar{b}_e^{(0)}-\tilde{b}_e^{(0)}$ $e \in E$;
$\Sigma_{(s,r) \in \Omega} b_s^{(j)} u_{r,(\tau 1[s], v)}^{(s)} x_r^{(s)} \leq \bar{b}_v^{(j)}-\tilde{b}_v^{(j)}$ $v \in V_{(d)}$, $j=1,2,3$;
$L[x_r^{(s)}]=(c_8'+\max_{j \in C} c_{4j}) \, k(s,v)+C_5 \Sigma_r h_r \, u_{r, (\tau 1[s], v)}^{(s)}$
$x_r^{(s)}+c_1 K_1(v)+c_2 K_2 \leq \varepsilon_3$, $\tau 1[s] \neq v \in V_{(d)}$, The following is description of the symbols in Formula (OP):

$R^{(s)}$: a set of paths that meet the required delay of accommodated network s among the paths on the physical network that are capable of accommodating the accommodated network. With $R^{(s)}$, the delay time of each physical link forming the physical network is used as a constraint condition.

[Formula 4]

$R^{(s)}$: a set of paths that meet the required delay of accommodated network s among the paths on the physical network that can accommodate the accommodated network s.

E: a set of physical links.

$T_c$: a set of accommodated networks not subjected to rearrangement.

$\tau 1[s]$: a server node as the end point of accommodated network s.

v: server node.

s: accommodated network.

q[s]: the disconnection rate of the accommodated network.

q[r]: the disconnection rate of physical path r.

$b_s^{(0)}$: the band being used by accommodated network s.

$\tilde{b}_s^{(0)}$: the band to be used by accommodated network s during VM relocation.

$b_s^{(1)}$: the number of CPU cores used by accommodated network s at the serer node as the end point thereof.

$b_s^{(2)}$: the memory volume used by accommodated network s at the serer node as the end point thereof.

$b_s^{(3)}$: the storage capacity used by accommodated network s at the sever node as the end point thereof.

$U_{r,(\tau 1[s],v)}^{(s)}$: a binary variable which assumes the value of 1 if accommodated network s ends server node $\tau 1[s]$ before rearrangement and if it ends at server node v after rearrangement, and assumes 0 otherwise.

$u_{r,e}^{(s)}$: a binary value that is 1 when path r on the physical network through which accommodated network s passes uses link e on the physical network and is 0 when it does not.

$\tilde{u}_{r,e}^{(s)}$: a binary value that is 1 when path r on the physical network being a candidate path for a path of accommodated network s for VM relocation uses link e on the physical network and is 0 when it does not.

$\breve{b}_e^{(0)}$: the available band of physical link e∈E.

$\bar{b}_e^{(0)}$: e used band of physical link e∈E.

$\bar{b}_v^{(1)}$: the number of available CPU cores of server node v.

$\bar{b}_v^{(2)}$: the available memory volume of server node v.

$\bar{b}_v^{(3)}$: the available storage capacity of server node v.

$\breve{b}_v^{(1)}$: the number of currently used CPU cores of server node v.

$\breve{b}_v^{(2)}$: the currently used memory volume of server node v.

$\breve{b}_v^{(3)}$: the currently used storage capacity of server node v.

y: an auxiliary variable for solving the optimization problem more efficiently.

$k(s,v) = \Sigma_r u_{r, (\tau 1[s], v)}^{(s)} x_r^{(s)} \in \{0,1\}$ $K_1(v) = \Sigma_{s',r}(1-a(v,s')) u_{r, (\tau 1[s'], v)}^{(s')} x_r^{(s')} \in N \cup \{0\}$ (N is a set of natural numbers)

$K_2 = \Sigma_{s'}(1 - \Sigma_v a(v',s'))(\Sigma u_{r, (\tau 1[s'], v)}^{(s')} x_r^{(s')})$ $a(v,s) = \Sigma_r u_{r, (\tau 1[s], v)}^{(s)} x_r^{(s)}$ $x_r^{(s)}$: a binary variable that is 1 when accommodated network s not subjected to rearrangement passes through physical path r and is 0 otherwise.

At step S107, the optimum calculation unit 143 solves the optimization problem (OP') below.

(OP)'

[Formula 5]

$$\text{Minimize } J(s;T) = k1 \max_{s \in T} q[s] + k2 \Sigma_{s \in T} q[s]/\#T;$$

s.t. $z \geq q[r] y_r$ $r \in U_{s \in S} R^{(s)}$;

$z \geq \max_{s \in Tc} q[s]$;

$x_r^{(s)} \leq y_r$ $(s,r) \in \Omega = U_{s \in Tc} \{s\} \times R^{(s)}$;

$z \in R_+$, $x_r^{(s)}$, $y_r \in \{0, 1\}$ $(s,r) \in \Omega$;

$\Sigma_{r \in R^{(s)}} x_r^{(s)} = 1$ $s \in T$;

$\Sigma_{(s,r) \in \Omega} b_s^{(0)} u_{r,e}^{(s)} x_r^{(s)} \leq \breve{b}_e^{(0)} - \bar{b}_e^{(0)}$ $e \in E$ In (OP)', an allowed delay of each upper accommodated network is the maximum among the accommodated networks accommodated in that upper accommodated network. Based on this, $R^{(s)}$ is computed. The disconnection rate of each upper accommodated network is equal to the disconnection rate of the physical path through which that upper accommodated network passes. The band is the sum of the bands used by the accommodated networks accommodated in that upper accommodated network.

The following is description of the symbols in Formula (OP)':

[Formula 6]

$R^{(s)}$: a set of paths that meet the required delay of slice s among the paths on the physical network that can accommodate slice s.

E: a set of physical links.

s: upper accommodated network.

q[s]: the disconnection rate of the upper accommodated network.

Tc: a set of accommodated networks not subjected to rearrangement.

q[r]: the disconnection rate of physical path r.

$b_s^{(0)}$: the band being used by upper accommodated network s.

$u_{r,e}^{(s)}$: a binary value that is 1 when path r on the physical network through which the upper accommodated network s passes uses link e on the physical network and is 0 when it does not.

$\breve{b}_e^{(0)}$: the available band of physical link e∈E.

$\bar{b}_e^{(0)}$: the used band of physical link e∈E.

$y_r$: an auxiliary variable for solving the optimization problem more efficiently.

When there are multiple solutions that assume the same objective function value for OP or OP', any one of them will be randomly adopted. Once the solution of the optimization problem is thus obtained, because a component with its value of variable $x_r^{(s)}$ being 1 indicates a candidate path for each accommodated network, the optimum calculation unit 143 outputs components with the value of variable $x_r^{(s)}$ being 1 as a combination of optimum paths, after which the processing ends.

Although in Formulae 3 and 5 the objective function is minimization of a weighted sum of the maximum and the average of the disconnection rate of each accommodated network with $k_1$ and $k_2$ (an accommodation form for the accommodated networks that achieves such minimization is searched for), the objective function may be minimization of the maximum or minimization of the average (the average disconnection rate), for example.

Shown below is a specific example of this embodiment, where the calculations described above are performed based on actual rainfall data in the past published by the Meteorological Agency and by applying the data to certain network facilities. The physical and logical networks assumed here are as shown in FIG. 1. The rainfall data utilized is rainfall data for heavy rain in Oita region which was observed in July, 2012.

To start with, the affected area estimation unit 112 calculates a cumulative rainfall index in each of 5-km mesh segments and estimates hazard areas (S3 in FIG. 5). Based on the result of hazard area estimation and the like, the evaluation unit 113 computes the failure rate of each physical link (S4 in FIG. 5).

Figure 11:
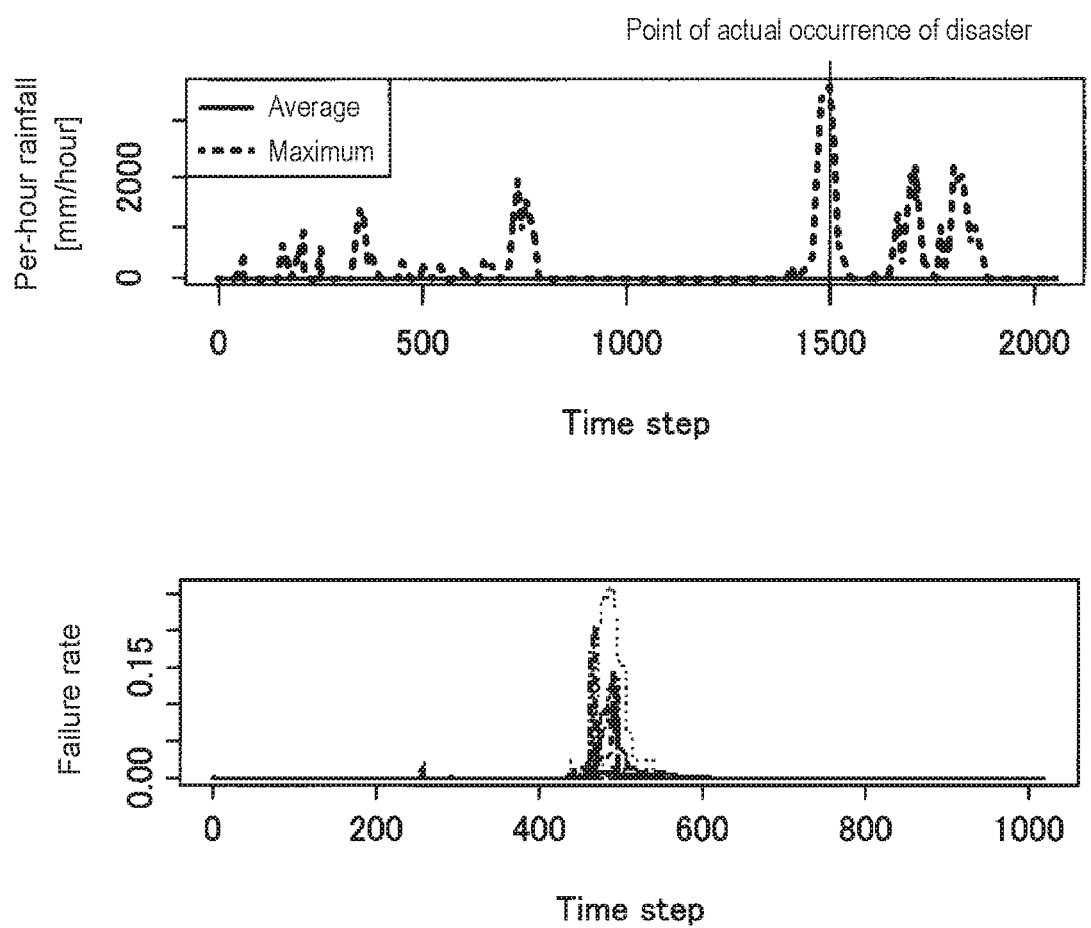
FIG. 11 shows the temporal transition of rainfall and the temporal transition of the failure rate of physical links in a specific example.

FIG. 11 shows the temporal transition of rainfall and the temporal transition of the failure rate of the physical links in the specific example. In FIG. 11, the upper portion shows the temporal transition of the average rainfall per unit time for all the meshes. The lower portion chronologically shows the values of the failure rate 1510 that were output for each one of ten physical links.

From FIG. 11, it can be seen that the transition of the failure rate 1510 of the physical links assume a trend analogous to the transition of rainfall in the upper portion.

Figure 12:
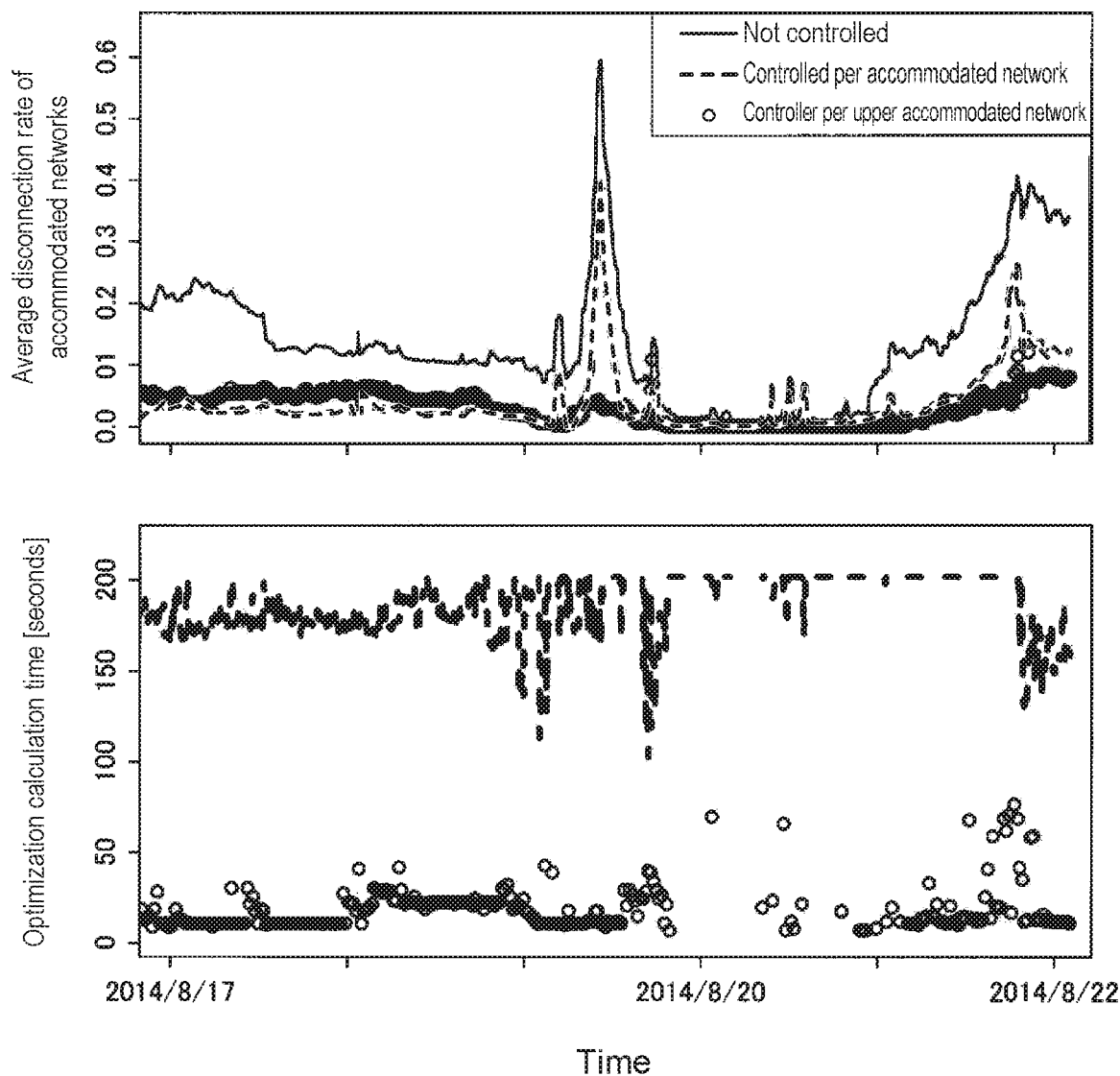
FIG. 12 is a diagram comparing the transition of an average disconnection rate of accommodated networks between when the first embodiment is applied and when it is not in a setting where 10,500 accommodated networks are accommodated.

FIG. 12 is a diagram comparing the transition of the average disconnection rate of accommodated networks between when this embodiment is applied and when it is not in a setting where 10,500 accommodated networks are accommodated. Specifically, FIG. 12 shows the average disconnection rate (the upper portion) that was computed for the accommodated networks (a single path here) with application of this embodiment using the failure rate 1510 shown in the lower portion of FIG. 11, and the required time for optimization calculation in that case (the lower portion). In the upper portion, the average disconnection rate that was computed without application of this embodiment ("not controlled") is indicated by thin solid line. Not applying this embodiment refers to a case of not executing rearrangement of the accommodated networks. Both the upper and lower portions show the results when rearrangement is performed per accommodated network and those when rearrangement is carried out with configuration of upper accommodated networks. For the sake of relocation time, time for optimization calculation is set at 200 seconds at maximum when rearrangement is carried out per accommodated network, and rearrangement is not carried out if the calculation does not end after the elapse of it.

From FIG. 12, it can be seen that the average disconnection rate of the accommodated networks decreases to about ¹/₁₂ in the case of carrying out rearrangement with configuration of upper accommodated networks in time periods in which rainfall increases and the failure rate 1510 of the physical links increases, indicating a remarkable effect resulting from the application of this embodiment.

The lower portion of FIG. 12 shows the transition of required time for optimization calculation for the two forms in which rearrangement is carried out. When rearrangement is carried out per accommodated network, the computation time reaches the maximum of 200 seconds in many cases, whereas when upper accommodated networks are configured, the computation time is kept within 100 seconds at most. This accordingly confirms that the required time for optimization calculation is reduced and desirable effect is obtained more with configuration of upper accommodated networks. As an initial arrangement in this example, ones of the accommodated networks that are to be accommodated into the same upper accommodated network are all randomly uniformly connected with the respective server nodes that can be deployed on virtual machines. It was also assumed that all the accommodated networks randomly had terminal points at relay nodes. Other factors are shown in Tables 1 and 2.

TABLE 1

| Parameter | $\theta_1$ | $\epsilon_2$ | $\chi_1$ | $\chi_2$ |
|---|---|---|---|---|
| Value | $10^{-5}$ | $10^{-5}$ | 1 | 0 |

TABLE 2

| | Parameter | | |
|---|---|---|---|
| | the number of accommodated networks | required band | physical link available band |
| Value | 10,500 | 10 | 100 |

For Table 2, the required band is common to the accommodated networks. The available band of the physical links is also common to the physical links.

As mentioned above, the first embodiment can reduce the required time for optimization calculation by integrating multiple accommodated networks having the same physical path into a single accommodated network. That is, the efficiency of calculation of an accommodation form for accommodated networks can be improved.

Further, the path of an accommodated network relevant to an area where a forecastable or predictable disaster is estimated occur is rearranged such that it is less affected by the disaster. Here, accommodated networks that can be rearranged include not only virtual networks but control networks for controlling virtual networks. That is, the geographical configuration of a virtual network or the control system for a virtual network can be optimized in terms of disaster tolerance. Thus, this embodiment can improve controllability on accommodated networks against disasters. For example, a telecommunication carrier can place its services in a controllable state even in a disaster emergency.

A second embodiment is now described. For the second embodiment, differences from the first embodiment are described. Matters that are not specified in the second embodiment may be similar to the first embodiment.

In the second embodiment, the objective function in the optimization problem to be solved by the optimum calculation unit 143 is different from that in the first embodiment. Specifically, in the second embodiment, minimization of the average disconnection rate of accommodated networks having disconnection rates within top $\alpha\%$ (a predetermined proportion of the top ones) (a particular subset of the accommodated networks) is the objective function. Here, $\alpha$ is a real number with $0<\alpha<100$. That is, consider replacement of (OP) and (OP)' with the problems below respectively given that $K=\alpha\#H$.

(OP)

$$\text{Minimize } \gamma; \quad \text{[Formula 7]}$$

s.t. $q[s] \leq \gamma + \beta s;$
  $\Sigma_{s \in T} \beta s = \text{floor } \{\#S \cdot (1 \cdot \alpha/100)\}$
  $z \geq \max_{s \in T^c} q[s];$
  $x_r^{(s)} \leq y_r \ (s,r) \in \Omega = U_{s \in T^c} \{s\} \times R^{(s)};$
  $\Sigma_{r \in R(s)} x_r^{(s)} = 1 \ s \in T;$
  $z \in R_+, x_r^{(s)}, y_r \in \{0, 1\} \ (s,r) \in \Omega;$
  $\Sigma_{(s,r) \in \Omega}(b_s^{(0)} u_{r,e}^{(s)} + \tilde{b}_s^{(0)} \tilde{u}_{r,e}^{(s)}) x_r^{(s)} \leq \bar{b}_e^{(0)} - \tilde{b}_e^{(0)} \ e \in E;$
  $\Sigma_{(s,r) \in \Omega} b_s^{(0)} u_{r,(\tau 1[s], v)}^{(s)} x_r^{(s)} \leq \bar{b}_v^{(j)} - \tilde{b}_v^{(j)} \ v \in V_{(d)}, j=1,2,3;$
  $L[x_r^{(s)}] = (c_3' + \max_{j \in c_{4j}}) k(s,v) + c_5 \Sigma_r h_r u_{r,(\tau 1[s], v)}^{(s)} x_r^{(s)} + c_1 K_1(v) + c_2 K_2 \leq \epsilon_3, \tau 1[s] \neq v \in V_{(d)},$ (OP)'

$$\text{Minimize } J(s;T) = \gamma; \quad \text{[Formula 8]}$$

s.t. $q[s] \leq \gamma + \beta s;$
  $\Sigma_{s \in T} \beta s = \text{floor } \{\#S \cdot (1 \cdot \alpha/100)\}$
  $z \geq q[r] y_r \ r \in U_{s \in S} R^{(s)};$
  $z \geq \max_{s \in T^c} q[s];$
  $x_r^{(s)} \leq y_r \ (s,r) \in \Omega = U_{s \in T^c} \{s\} \times R^{(s)};$
  $z \in R_+, x_r^{(s)}, y_r \in \{0, 1\} \ (s,r) \in \Omega;$
  $\Sigma_{r \in R^{(a)}} x_r^{(s)} = 1 \ s \in T;$
  $\Sigma_{(s,r) \in \Omega} b_s^{(0)} u_{r,e}^{(s)} x_r^{(s)} \leq \bar{b}_e^{(0)} - \tilde{b}_e^{(0)} \ e \in E$ If there are multiple solutions with the same objective function value, one of them will be randomly adopted. Once the solution of the optimization problem is thus obtained, because a component with its value of variable $x_r^{(s)}$ being 1 indicates a candidate path for each accommodated network or upper accommodated network, the optimum calculation unit 143 outputs components with the value of variable $x_r^{(s)}$ being 1 as a combination of optimum paths, after which the processing ends.

A third embodiment is now described. For the third embodiment, differences from the first or the second embodiment are described. Matters that are not specified in the third embodiment may be similar to the first or the second embodiment.

In the third embodiment, an upper limit on the computation time (hereinafter referred to as "time limit") is imposed in the optimization problem to be solved by the optimum calculation unit 143. In this case, if the solution cannot be obtained by the time limit, it is considered that there is no executable solution and the processing ends without performing rearrangement at the conditional branch determination unit 141.

In the embodiments described above, the operation center 110 is an example of the accommodation form search apparatus. The physical-logical mapping unit 142 is an example of the computation unit. The optimum calculation unit 143 is an example of the search unit.

While the embodiments of the present invention have been described in detail, the present invention is not intended to be limited to such particular embodiments but various variations and modifications are possible within the scope of the present invention as set forth in the claims.

REFERENCE SIGNS LIST 10 server
11 switch
12 conduit network
13 data center (or network center)
20 Meteorological Agency device
30 municipality device
100 drive device
101 recording medium
102 auxiliary storage device
103 memory device
104 CPU
105 interface device
110 operation center
111 control unit
112 affected area estimation unit
113 evaluation unit
114 optimum accommodation form computation unit
115 communication unit
116 affected area storage unit
117 network information storage unit
141 conditional branch determination unit
142 physical-logical mapping unit
143 optimum calculation unit
B bus
N1 physical network

The invention claimed is:

1. An accommodation form search apparatus comprising:
a computation unit, including one or more processors, that is configured to compute a failure rate of each of multiple physical links forming a physical network based on information indicating a disaster-affected area; and
a search unit, including one or more processors, that is configured to search for an accommodation form with which a disconnection rate computed based on the failure rate of each physical link is reduced for a path of an accommodated network to be accommodated into a logical network which is configured utilizing the physical network,
wherein the search unit is configured to search for the accommodation form by treating a plurality of accommodated networks having a same physical path as a single accommodated network.

2. The accommodation form search apparatus according to claim 1, wherein the search unit is configured to search for the accommodation form based on an average of the disconnection rate of each of the plurality of accommodated networks, a weighted sum of the average and a maximum, or an average of the disconnection rate within a particular subset of the plurality of accommodated networks.

3. The accommodation form search apparatus according to claim 1, wherein the search unit is configured to search for the accommodation form using a delay time of each of the multiple physical links forming the physical network as a constraint condition.

4. An accommodation form searching method comprising executing, by a computer:
a computation step of computing a failure rate of each of multiple physical links forming a physical network based on information indicating a disaster-affected area; and
a searching step of searching for an accommodation form with which a disconnection rate computed based on the failure rate of each physical link is reduced for a path of an accommodated network to be accommodated into a logical network which is configured utilizing the physical network,
wherein the searching step comprises searching for the accommodation form by treating a plurality of accommodated networks having a same physical path as a single accommodated network.

5. The accommodation form searching method according to claim 4, wherein the searching step comprises searching for the accommodation form based on an average of the disconnection rate of each of the plurality of accommodated networks, a weighted sum of the average and a maximum, or an average of the disconnection rate within a particular subset of the plurality of accommodated networks.

6. The accommodation form searching method according to claim 4, wherein the searching step comprises searching for the accommodation form using a delay time of each of the multiple physical links forming the physical network as a constraint condition.

7. A non-transitory computer readable medium storing instructions that when executed by a computer cause the computer to perform an accommodation form searching method comprising executing:
a computation step of computing a failure rate of each of multiple physical links forming a physical network based on information indicating a disaster-affected area; and
a searching step of searching for an accommodation form with which a disconnection rate computed based on the failure rate of each physical link is reduced for a path of an accommodated network to be accommodated into a logical network which is configured utilizing the physical network,
wherein the searching step comprises searching for the accommodation form by treating a plurality of accommodated networks having a same physical path as a single accommodated network.

8. The non-transitory computer readable medium according to claim 7, wherein the searching step comprises searching for the accommodation form based on an average of the disconnection rate of each of the plurality of accommodated networks, a weighted sum of the average and a maximum, or an average of the disconnection rate within a particular subset of the plurality of accommodated networks.

9. The non-transitory computer readable medium according to claim 7, wherein the searching step comprises searching for the accommodation form using a delay time of each of the multiple physical links forming the physical network as a constraint condition.

* * * * *